(No Model.)
J. E. RAUSHECK.
PLANTER.
No. 589,096. Patented Aug. 31, 1897.
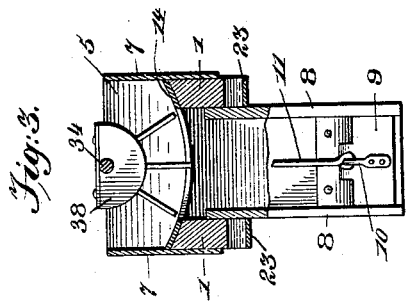
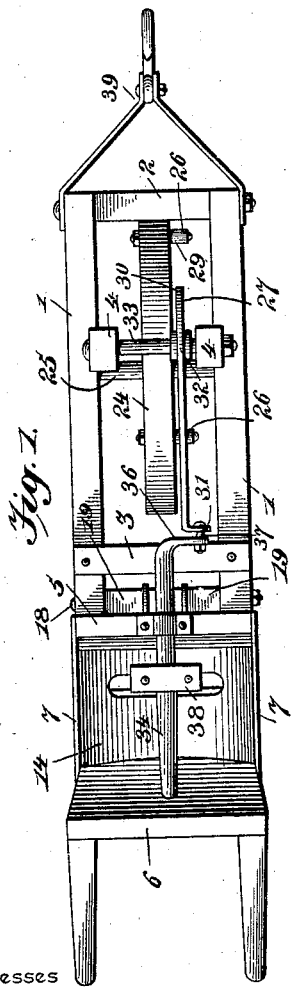
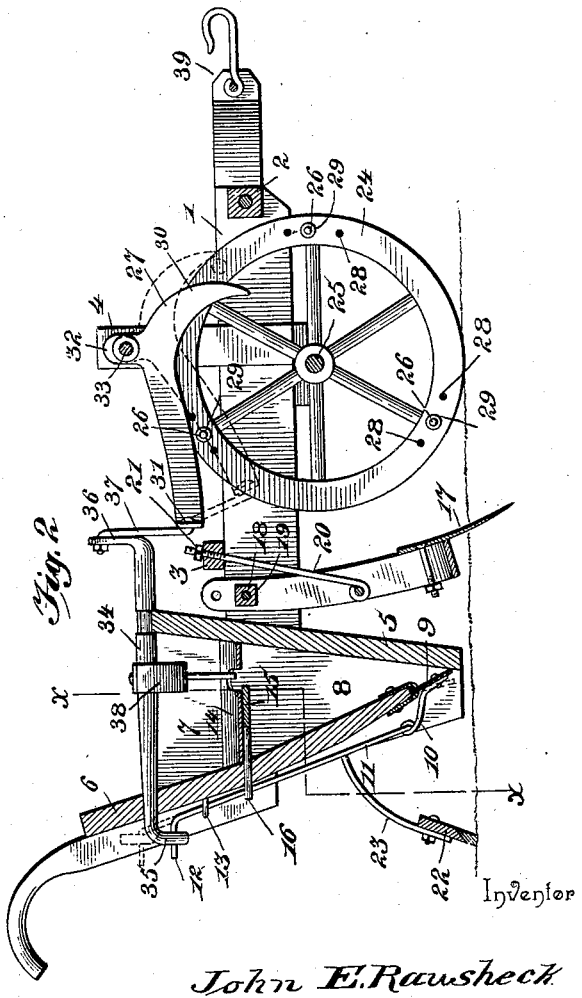
Witnesses
H. F. Dieterich
V. B. Hillyard.
Inventor
John E. Rausheck
By his Attorneys,
C. A. Snow & Co.

UNITED STATES PATENT OFFICE.

JOHN E. RAUSHECK, OF LINDEN, TEXAS, ASSIGNOR OF ONE-HALF TO J. B. HAYNES AND W. F. FORD, OF SAME PLACE.

PLANTER.

SPECIFICATION forming part of Letters Patent No. 589,096, dated August 31, 1897.

Application filed April 20, 1897. Serial No. 633,034. (No model.)

*To all whom it may concern:*

Be it known that I, JOHN E. RAUSHECK, a citizen of the United States, residing at Linden, in the county of Cass and State of Texas, have invented a new and useful Planter, of which the following is a specification.

This invention relates to machines especially designed for sowing seed in rows at required distances apart, and aims to combine therewith a mechanism for insuring a positive discharge of the seed in desired quantity and at predetermined intervals in the length of a row. The seed-dropping mechanism is adjustable to suit the nature of the seed to be planted and to drop the same closer together or farther apart, as desired.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan of a planter constructed in accordance with this invention. Fig. 2 is a longitudinal section thereof, showing the operation of the actuating mechanism by dotted lines. Fig. 3 is a transverse section on the line *x x* of Fig. 2, looking to the front.

Corresponding and like parts are referred to in the following description and indicated in the several views of the drawings by the same reference-characters.

The frame comprises longitudinal bars 1, cross-bars 2 and 3, and uprights 4, the latter being secured to the longitudinal bars a short distance from their front ends. A hopper is applied to the rear end of the frame and consists of front and rear pieces 5 and 6, side plates 7, and side pieces 8, the latter being secured to the lower portions of the parts 5 and 6 and extending a short distance in the rear of the part 6, and the plates 7 closing the sides and secured to the parts 5 and 6 at a point above the bars 1. The side plates 7 are parallel, whereas the side pieces 8 converge slightly toward their lower ends and the front and rear pieces 5 and 6 flare toward their upper ends, and the rear piece 6 terminates a short distance from the lower ends of the side pieces 8 and the front piece 5 and is provided with a valve 9, which closes against the front piece, said valve having a rearwardly-extending arm 10, to which a rod 11 is attached, and extends upwardly and is bent to provide a rearward extension 12. The valve is held closed by the weight of the arm 10 and the rod 11, and the latter is retained in place and guided in its movements by a staple or keeper 13. The hopper-bottom 14 is elevated and is about in the plane of the longitudinal bars 1 and is curved transversely of the machine, and the discharge-opening formed therein extends at right angles to the line of motion of the machine and is regulated by a slide 15, movable by means of rods 16, extending through openings in the rear piece 6, and this bottom is removable, so as to be replaced by another having a differently-formed discharge-opening, thereby adapting the machine to the nature of the seed to be planted.

The furrow-opener 17 is located in advance of the hopper and is vertically adjustable, being mounted upon a rod or bolt 18, passing through the longitudinal bars 1 and held against lateral displacement by spacing-blocks 19, strung upon the rod or bolt 18. A brace 20, having connection at its lower end with the standard of the furrow-opener, has its upper portion threaded and passing through an opening in the cross-bar 3 and receiving an adjusting-nut 21, by means of which the pitch of the furrow-opener can be regulated and the length of the brace adjusted to suit the height of the said opener. The coverer 22 is a board or plate having its lower edge depressed or made concave to round up the rows, and spring-arms 23, attached at their front ends to the bars 1 and having their rear ends curving downward and secured to the said board or plate.

The ground-wheel 24 is mounted upon an axle 25, supported in bearings applied to the longitudinal bars 1, and is provided on one side with a series of tappets 26 to engage with a lever 27 for vibrating it and causing a discharge of the seed in the manner presently to be explained. These tappets 26 consist of bolts or pins let into openings 28, provided in the ground-wheel, and sleeves or washers 29, placed upon the said pins or bolts to relieve the frictional engagement between the tappets and the lever 27. The lever 27 has its front end bent or provided with a beak 30 and its lower edge curved outwardly and its rear end bent, as indicated at 31. An extension 32, forming a part of or applied to the lever near its front end, receives a pin or bolt 33, connecting the upper ends of the uprights 4, thereby providing a mounting for the said lever. The inner or lower edge of the beak 30 and the lower edge of the rear portion of the lever are disposed so as to alternately extend within the path of the tappets 26, whereby the said lever is positively actuated in each direction or vibrated so as to operate the seeding mechanism, as will appear more fully hereinafter. A rock-shaft 34 is journaled longitudinally of the machine and in the front and rear pieces 5 and 6, and its rear end is bent, as shown at 35, to engage with the upper bent end 12 of the rod 11, and its front end is bent, as shown at 36, and is connected by means of a link 37 with the bent end 31 of the lever 27. From this construction it is apparent that any vibration of the lever 27 will cause a rocking movement of the shaft 34. An agitator or stirrer 38 of suitable design is secured to the rock-shaft 34 and operates in the hopper and serves to prevent banking or clogging of the seed and insures a positive feed thereof when the planter is in operation.

The tappets 26 will be provided in desired number and secured to the ground-wheel at required distances apart corresponding with the intervals or spaces to be formed between the hills or points of planting the seed, and as the machine is drawn over the field by hitching a team or applying the draft to the hounds 39 the tappets will alternately engage with the rear and front portions of the lever 27 and vibrate or oscillate it upon its support 33 and rock the shaft 34 in its bearings and, by means of the agitator or stirrer 38, cause the seed to pass through the discharge-opening in the bottom 14 of the hopper and enter the space formed in the lower portion of the hopper, and which may be properly termed a "spout," the seed being retained in the spout by the valve 9, which is opened at each complete rocking movement of the shaft 34 by means of its bent end 35 engaging with the bent end 12 of the rod 11, whereby the seed is properly distributed at the required intervals apart.

Cotton-seed planted by this machine does not require the rows of plants to be subsequently thinned by chopping, as the seed is planted transversely of the furrow at any required distance apart by dropping upon the valve 9, which scatters them. After the plants are up they can be cut to a stand by a horse and plow, thereby obviating the use of chopping-machines.

Having thus described the invention, what is claimed as new is—

1. In a planter, the combination of a valve located at the lower end of the spout, a rod having connection with the valve and provided with a rear extension at its upper end, a rock-shaft extending across the hopper and having its rear end bent to engage with the rear extension of the valve-operating rod for opening the valve, an agitator or seed-dropping device secured upon the rock-shaft and operating in the hopper, a vibrating lever having connection with the rock-shaft, and a ground-wheel having tappets for vibrating the lever positively in each direction for operating the rock-shaft and the parts connected therewith, substantially as set forth.

2. In a planter, the combination of a valve for closing the lower end of the grain-spout, a rod having connection with the valve and having its upper end bent rearwardly, a rock-shaft journaled lengthwise of the machine and extending across the hopper, and having its end portions bent, the rear bent end engaging with the upper bent end of the valve-rod for opening the valve, a lever fulcrumed between its ends, a link connecting the rear end of the lever with the front bent end of the rock-shaft, and a ground-wheel provided with tappets for positively vibrating the lever in each direction, substantially as set forth for the purpose described.

3. In a planter, the combination of a hopper, a rock-shaft extending across the hopper and provided with a seed agitating or dropping device, a lever fulcrumed between its ends and having a beak at its front end, means for connecting the rear end of the lever with a bent portion of the rock-shaft, and a ground-wheel provided with tappets disposed to alternately engage with the rear and front portions of the said lever for positively actuating it in each direction, substantially in the manner set forth for the purpose described.

4. In a planter, the combination of longitudinal bars, front and rear pieces flaring at their upper ends, side plates secured to the edges of the front and rear pieces and to the longitudinal bars, and side pieces secured to the front and rear pieces below the plane of the longitudinal bars and having their rear portions extending in the rear of the aforesaid rear piece, a valve secured to the lower end of the rear piece and operating in the space formed between the rear extensions of the side pieces, and actuating mechanism for the said valve, substantially as set forth.

5. In a planter, the combination of a hopper, a frame having uprights, a rock-shaft extending across the hopper and provided with a seed agitating or dropping device, a lever having a beak at its front end and an extension between its ends, a link connecting the rear end of the lever with a lateral extension of the rock-shaft, a pin or bolt connecting the upper ends of the said uprights and passing through the extension of the lever and forming a pivotal support therefor, and a ground-wheel having tappets to alternately engage with the lever upon opposite sides of its pivotal support, substantially as set forth for the purpose described.

In testimony that I claim the foregoing as my own I have hereto affixed my signature in the presence of two witnesses.

JOHN E. RAUSHECK.

Witnesses:
    THOS. B. PRICE,
    F. L. FROST.